US012661966B2

(12) United States Patent
Duan et al.

(10) Patent No.: US 12,661,966 B2
(45) Date of Patent: Jun. 23, 2026

(54) BATTERY PACK HAVING AN INTEGRATED COOLING SYSTEM

(71) Applicant: GM Global Technology Operations LLC, Detroit, MI (US)

(72) Inventors: Chengwu Duan, Shanghai (CN); Jian Yao, Shanghai (CN); Zhenwen Hu, Shanghai (CN); Yusheng Zou, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 535 days.

(21) Appl. No.: 18/193,772

(22) Filed: Mar. 31, 2023

(65) Prior Publication Data

US 2024/0253442 A1      Aug. 1, 2024

(30) Foreign Application Priority Data

Jan. 31, 2023    (CN) .......................... 202310052747.0

(51) Int. Cl.
| | |
|---|---|
| *B60K 1/04* | (2019.01) |
| *H01M 10/613* | (2014.01) |
| *H01M 10/625* | (2014.01) |
| *H01M 10/6556* | (2014.01) |
| *H01M 10/6569* | (2014.01) |
| *H01M 50/209* | (2021.01) |
| *B60K 1/00* | (2006.01) |

(52) U.S. Cl.
CPC ............. *B60K 1/04* (2013.01); *H01M 10/613* (2015.04); *H01M 10/625* (2015.04); *H01M 10/6556* (2015.04); *H01M 10/6569* (2015.04);

*H01M 50/209* (2021.01); *B60K 2001/006* (2013.01); *H01M 2220/20* (2013.01)

(58) Field of Classification Search
CPC ............................ B60K 1/04; B60K 2001/006
See application file for complete search history.

(56) References Cited

U.S. PATENT DOCUMENTS

| | | | | |
|---|---|---|---|---|
| 9,373,873 B2 * | 6/2016 | Lev | ...................... | H01M 10/613 |
| 10,109,901 B2 | 10/2018 | Rhodes et al. | | |
| 11,254,236 B2 | 2/2022 | Dziubinschi et al. | | |

(Continued)

FOREIGN PATENT DOCUMENTS

| | | |
|---|---|---|
| DE | 102010038600 A1 | 2/2012 |
| DE | 102017116420 A1 | 1/2018 |
| DE | 112020005112 T5 | 7/2022 |

OTHER PUBLICATIONS

German Application No. 10 2023 107 678.7 filed Mar. 27, 2023; German Office Action dated Aug. 1, 2023; 6 pages.

*Primary Examiner* — Brian L Swenson
(74) *Attorney, Agent, or Firm* — CANTOR COLBURN LLP

(57) ABSTRACT

A battery pack includes a first header including a first conduit, a second header including a second conduit, and an energy storage system including a plurality of energy storage cells arranged between the first header and the second header. A coolant plate is arranged between the first header and the second header and abuts the plurality of energy storage cells. The coolant plate including a coolant channel having a first end fluidically connected to the first conduit, a second end fluidically connected to the second conduit, and an intermediate portion defining a flow path.

20 Claims, 6 Drawing Sheets

(56) References Cited

U.S. PATENT DOCUMENTS

| | | | |
|---|---|---|---|
| 11,511,648 B2 * | 11/2022 | Yoshida | H01M 10/6556 |
| 2009/0087727 A1 * | 4/2009 | Harada | H01M 10/613 |
| | | | 429/120 |
| 2011/0052960 A1 * | 3/2011 | Kwon | H01M 10/0481 |
| | | | 429/120 |
| 2011/0212355 A1 * | 9/2011 | Essinger | H01M 10/6555 |
| | | | 429/120 |
| 2013/0183555 A1 * | 7/2013 | Boddakayala | H01M 10/625 |
| | | | 29/890.03 |
| 2014/0220404 A1 * | 8/2014 | Masuda | H01M 50/224 |
| | | | 429/120 |
| 2021/0057789 A1 | 2/2021 | Lee et al. | |
| 2021/0135305 A1 * | 5/2021 | David | H01M 10/625 |
| 2022/0158267 A1 * | 5/2022 | Kim | H01M 10/6556 |
| 2023/0387505 A1 * | 11/2023 | Taniguchi | H01M 10/6568 |

* cited by examiner

BATTERY PACK HAVING AN INTEGRATED COOLING SYSTEM

CROSS-REFERENCE TO RELATED APPLICATIONS

This application claims priority to Chinese patent application Ser. No. 202310052747.0, filed Jan. 31, 2023, the contents of which are incorporated by reference herein in their entirety.

INTRODUCTION

The subject disclosure relates to the art of rechargeable energy storage systems and, more particularly, to a rechargeable energy storage system for a vehicle including a battery pack having an integrated cooling system.

Rechargeable energy storage systems (RESS) typically include one or more battery packs having rechargeable energy storage cells. The battery pack is connectable to an external charging system that replenishes electrical energy lost to a load. The charging system may be part of a vehicle, or may be part of an external charging station. When providing power to a vehicle, the battery pack discharges stored electrical energy. Replenishing and discharging the stored electrical energy creates heat which, if not removed, can detract from battery pack efficiency.

There are a wide array of systems employed to cool batteries. For example, many batteries will include a forced air convection system that delivers a flow of air over battery components. Other systems may employ heat sinks that absorb heat. Absorbed heat may be given up to forced air currents. Still other systems may employ cold plates. A cold plate is typically formed from aluminum and may include internal passages that circulate a fluid. The fluid absorbs heat that may be given off from a battery pack in thermal contact with the cold plate. While existing systems are effective, forced air systems and cold plates lack a desirable efficiency to absorb large amounts of heat that may be produced by larger battery packs. Accordingly, the art would welcome a more efficient heat mitigation system for vehicle battery packs.

SUMMARY

A battery pack, in accordance with a non-limiting example, includes a first header including a first conduit, a second header including a second conduit, and an energy storage system including a plurality of energy storage cells arranged between the first header and the second header. A coolant plate is arranged between the first header and the second header and abuts the plurality of energy storage cells. The coolant plate including a coolant channel having a first end fluidically connected to the first conduit, a second end fluidically connected to the second conduit, and an intermediate portion defining a flow path.

In addition to one or more of the features described herein the coolant plate includes a first, substantially planar surface abutting the plurality of energy cells and a second surface that is curvilinear.

In addition to one or more of the features described herein another plurality of energy cells is arranged between the first header and the second header and spaced from the plurality of energy cells, and another coolant plate is arranged between the first header and the second header and abutting each of the another plurality of energy storage cells, the another coolant plate including another coolant channel having a first end portion fluidically connected to the first conduit, a second end portion fluidically connected to the second conduit, and an intermediate section defining another flow path.

In addition to one or more of the features described the another coolant plate includes a first, substantially planar surface section abutting the plurality of energy cells and a second surface section that is curvilinear.

In addition to one or more of the features described herein the second surface of the coolant plate abuts the second surface portion of the another coolant plate at a coolant plate interface.

In addition to one or more of the features described herein a first air gap is arranged at a first side of the coolant plate interface and a second air gap is arranged at a second side of the coolant plate interface.

In addition to one or more of the features described herein the coolant channel includes a first plurality of semi-circular channels spaced one from another along the second surface and the another coolant channel includes a second plurality of semi-circular channels spaced one from another along the second surface portion, a portion of the second plurality of semi-circular coolant channels being disposed between adjacent ones of the first plurality of semi-circular coolant channels.

In addition to one or more of the features described herein an amount of coolant fluid is arranged in the first conduit, the coolant channel, and the second conduit.

In addition to one or more of the features described herein the amount of coolant fluid comprises a two-phase fluid.

In addition to one or more of the features described herein the first conduit includes a first coolant inlet conduit and a first coolant outlet conduit and the second conduit includes a second coolant inlet conduit and a second coolant outlet conduit, the first coolant inlet conduit being fluidically connected to the second coolant outlet conduit and the second coolant inlet conduit being fluidically connected to the first coolant outlet conduit.

A vehicle, in accordance with a non-limiting example, includes a body defining a passenger compartment, an electric motor supported in the body, and a battery pack operatively connected to the electric motor. The battery pack includes a first header including a first conduit, a second header including a second conduit, and a plurality of energy storage cells arranged between the first header and the second header. A coolant plate is arranged between the first header and the second header and abuts the plurality of energy storage cells. The coolant plate includes a coolant channel having a first end fluidically connected to the first conduit, a second end fluidically connected to the second conduit, and an intermediate portion defining a flow path.

In addition to one or more of the features described herein the coolant plate includes a first, substantially planar surface abutting the plurality of energy cells and a second surface that is curvilinear.

In addition to one or more of the features described herein another plurality of energy cells is arranged between the first header and the second header and spaced from the plurality of energy cells, and another coolant plate is arranged between the first header and the second header and abuts each of the another plurality of energy storage cells, the another coolant plate including another coolant channel having a first end portion fluidically connected to the first conduit, a second end portion fluidically connected to the second conduit, and an intermediate section defining another flow path.

In addition to one or more of the features described herein the another coolant plate includes a first, substantially planar surface section abutting the plurality of energy cells and a second surface section that is curvilinear.

In addition to one or more of the features described herein the second surface of the coolant plate abuts the second surface portion of the another coolant plate at a coolant plate interface.

In addition to one or more of the features described herein a first air gap is arranged at a first side of the coolant plate interface and a second air gap is arranged at a second side of the coolant plate interface.

In addition to one or more of the features described herein the coolant channel includes a first plurality of semi-circular channels spaced one from another along the second surface and the another coolant channel includes a second plurality of semi-circular channels spaced one from another along the second surface portion, a portion of the second plurality of semi-circular coolant channels being disposed between adjacent ones of the first plurality of semi-circular coolant channels.

In addition to one or more of the features described herein an amount of coolant fluid arranged in the first conduit, the coolant channel, and the second conduit.

In addition to one or more of the features described herein the amount of coolant fluid comprises a two-phase fluid.

In addition to one or more of the features described herein the first conduit includes a first coolant conduit and a first coolant outlet conduit and the second conduit includes a second coolant inlet conduit and a second coolant outlet conduit, the first coolant inlet conduit being fluidically connected to the second coolant outlet conduit and the second coolant inlet conduit being fluidically connected to the first coolant outlet conduit.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
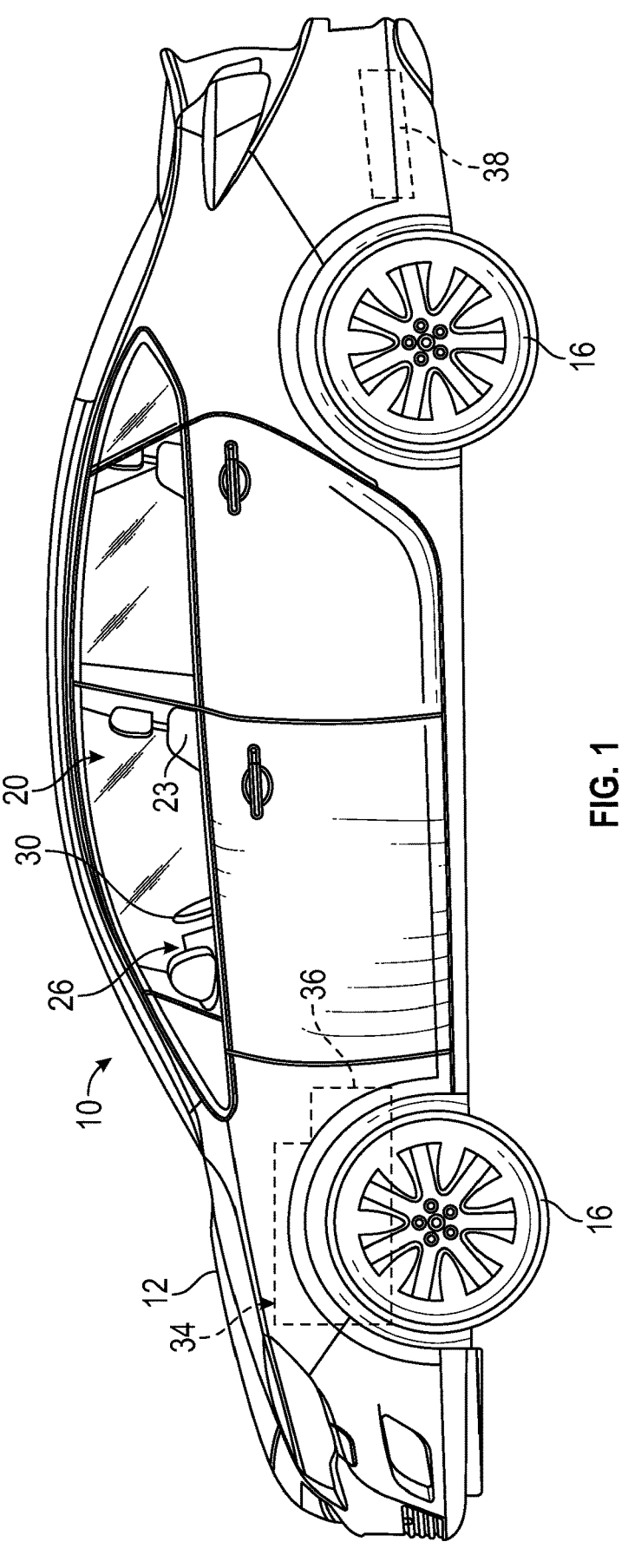
FIG. 1 is a left side view of a vehicle including a rechargeable energy storage system having a battery pack including an integrated cooling system, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a plurality of wheels 16. One or more of the plurality of wheels 16 are steerable. Body 12 defines, in part, a passenger compartment 20 having seats 23 positioned behind a dashboard 26. A steering control 30 is arranged between seats 23 and dashboard 26. Steering control 30 is operated to control orientation of the steerable wheel(s).

Figure 2:
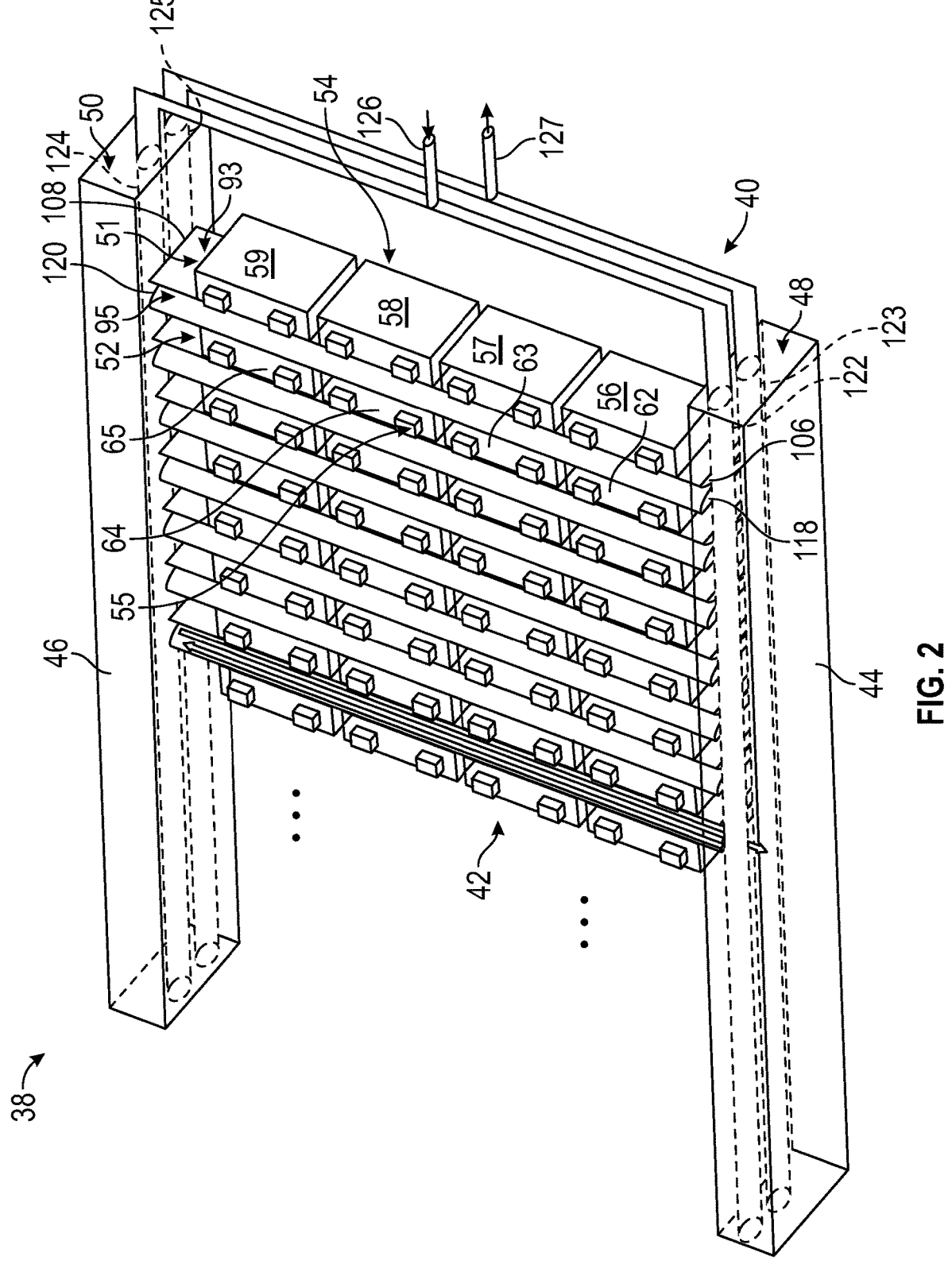
FIG. 2 is a schematic view of a portion of a battery pack including a first plurality of cells and a second plurality of cells separated by a first coolant plate and a second coolant plate, in accordance with a non-limiting example.
Figure 3:
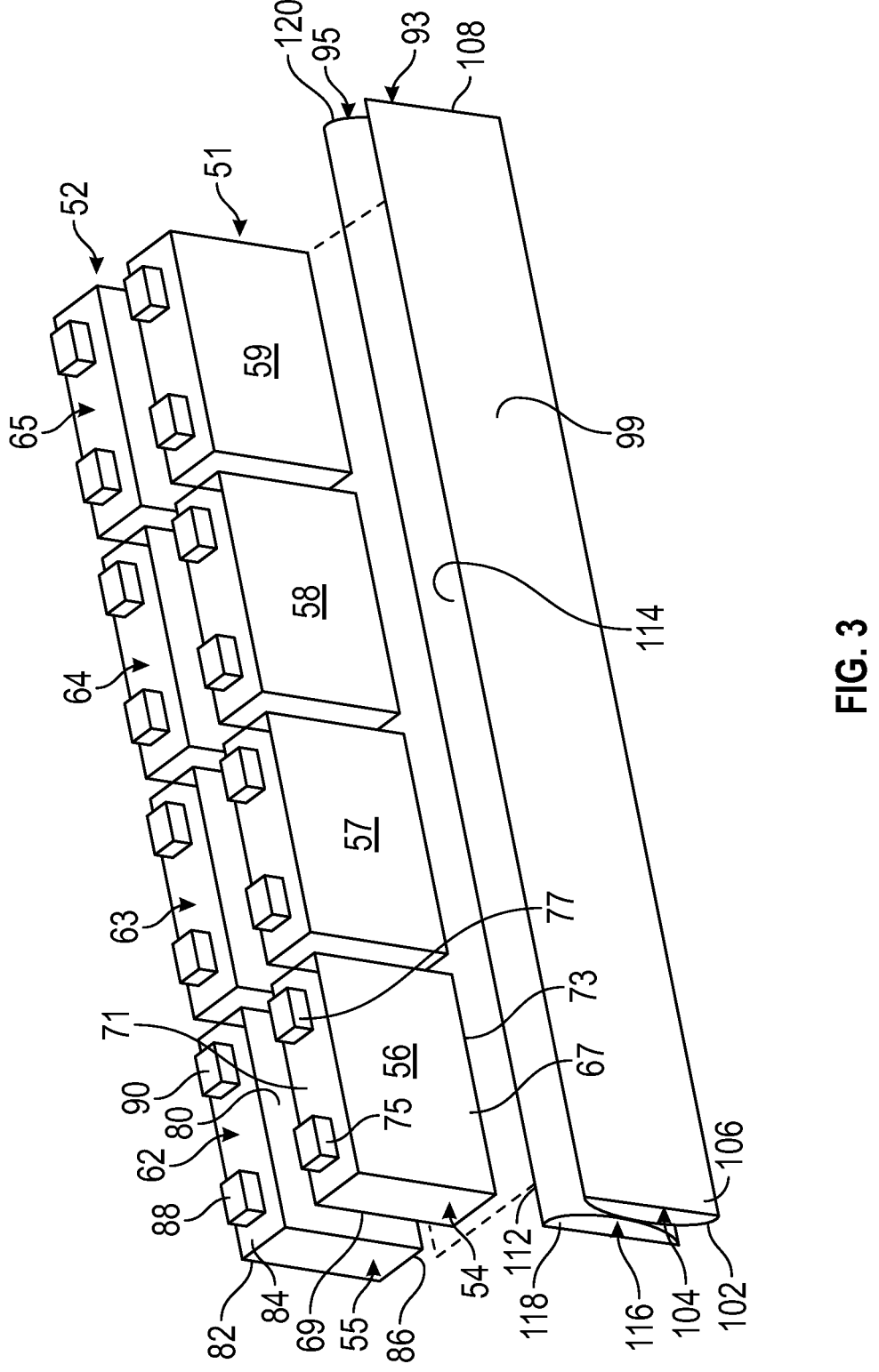
FIG. 3 is a disassembled view of the first plurality of cells and second plurality of cells and first and second coolant plates, in accordance with a non-limiting example.

Vehicle 10 includes an electric motor 34 connected to a transmission 36 that provides power to one or more of the plurality of wheels 16. A rechargeable energy storage system (RESS) 38 is arranged in body 12 and provides power to electric motor 34. At this point, it should be understood that the location of electric motor 34, transmission 36, and RESS 38 in body 12 may vary. Referring to FIGS. 2 and 3, RESS 38 includes a battery pack 40 including an energy storage system, indicated generally at 42.

Energy storage system 42 is arranged between a first header 44 and a second header 46. First header 44 includes a first interior 48 and second header 46 includes a second interior 50. In the non-limiting example shown, energy storage system 42 includes a first energy storage cell row 51 and a second energy storage cell row 52 arranged alongside and parallel to first energy storage cell row 51. While only two energy storage cells rows 51, 52 are discussed, it should be understood that the number and arrangement of energy storage cell rows, arranged between first header 44 and second header 46 may vary.

First energy storage cell row 51 includes a first plurality of energy storage cells 54 and second energy storage cell row 52 includes a second plurality of energy storage cells 55. First plurality of energy storage cells 54 includes a first energy storage cell 56, a second energy storage cell 57, a third energy storage cell 58, and a fourth energy storage cell 59. Second plurality of energy storage cells 55 includes a fifth energy storage cell 62, a sixth energy storage cell 63, a seventh energy storage cell 64, and an eighth energy storage cell 65. The number of cells in each energy storage cell row may vary.

Figure 4:
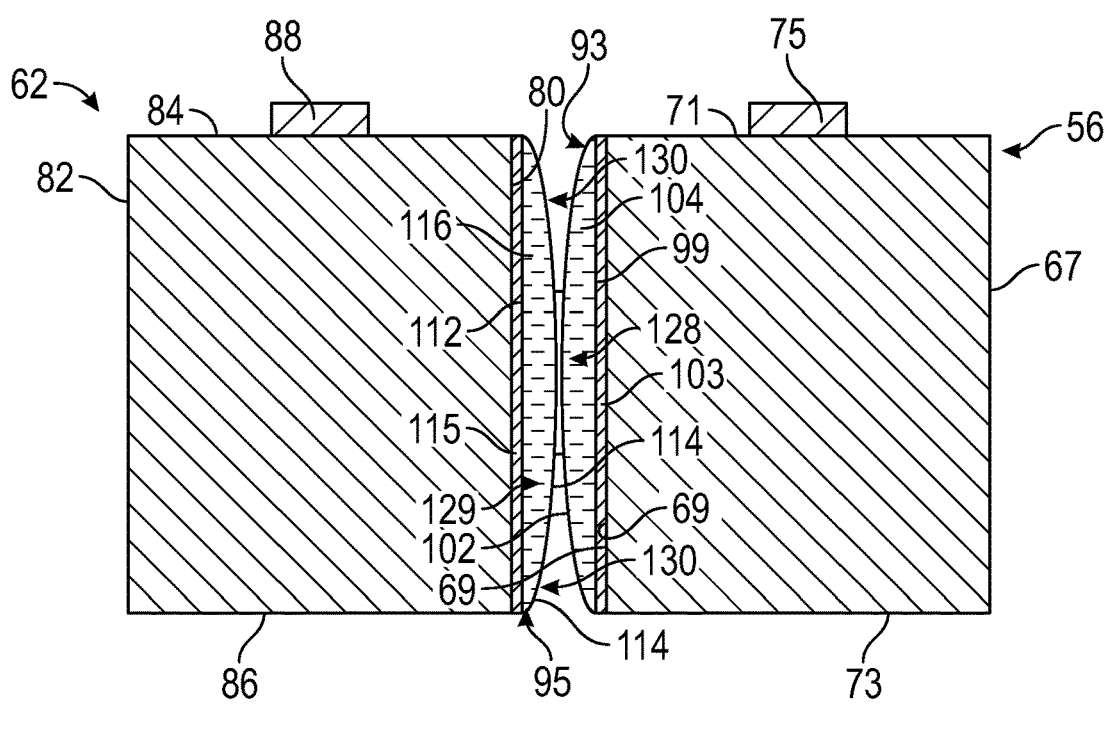
FIG. 4 is a side elevational view of one of the first plurality of cells and one of the second plurality of cells and first and second coolant plates of FIG. 3 including an amount of coolant fluid, in accordance with a non-limiting example.

Reference will now follow to FIGS. 3 and 4 with continued reference to FIG. 2 in describing first energy storage cell 56 and fifth energy storage cell 62 with an understanding that the remaining energy storage cells 57-59 and 63-65 include similar structure. In a non-limiting example, first energy storage cell 56 includes a first surface 67, a second surface 69 that is generally parallel to first surface 67, a third surface 71 that extends between first surface 67 and second surface 69, and a fourth surface 73 that is generally parallel to third surface 71. First energy storage cell 56 includes additional surfaces (not separately labeled). Electrical connection elements, shown in the form of an anode 75 and a cathode 77, are arranged on third surface 71.

Fifth energy storage cell 62 includes a first surface portion 80, a second surface portion 82 that is generally parallel to first surface portion 80, a third surface portion 84 that extends between first surface portion 80 and second surface portion 82, and a fourth surface portion 86 that is generally parallel to third surface portion 84. Fifth energy storage cell 62 includes additional surfaces (not separately labeled). Electrical connection elements, shown in the form of an anode member 88 and a cathode member 90, are arranged on third surface portion 84.

In a non-limiting example, battery pack 40 includes a first coolant plate 93 arranged on second surface 69 of each of the first plurality of energy storage cells 54 and a second coolant plate 95 arranged on the first surface portion 80 of each of the second plurality of energy storage cells 55. In a non-limiting example, first coolant plate 93 and second coolant plate 95 abut one another and are disposed between adjacent rows of energy storage cells as shown in FIG. 2. In a non-limiting example shown in FIG. 3, first coolant plate 93 includes a first substantially planar surface 99 and a second, curvilinear surface 102. First substantially planar surface 99 is secured to each of the first plurality of energy storage cells 54 through a first adhesive member 103. First coolant plate 93 includes a first coolant channel 104 that extends between a first end 106 arranged at first header 44 and a second end 108 arranged at second header 46.

In a non-limiting example, second coolant plate 95 includes a first, substantially planar surface section 112 and a second, curvilinear surface section 114 that abuts second, curvilinear surface 102 of first coolant plate 93. First surface section 112 is secured to each of the second plurality of energy storage cells 55 through a second adhesive member 115. Second coolant plate 95 includes a second coolant channel 116 that extends between a first end section 118 arranged at first header 44 and a second end section 120 arranged at second header 46.

In a non-limiting example illustrated in FIG. 2, a first coolant inlet conduit 122 extends through first header 44 and is fluidically connected to first coolant channel 104 at first end 106. A first coolant outlet conduit 123 extends through first header 44 and is fluidically connected to second coolant channel 116 at 102 first end section 118. At this point, it should be appreciated that first coolant inlet conduit 122 and first coolant outlet conduit 123 are fluidically connected to coolant channels (not separately labeled) passing through remaining ones of the first and second coolant plates.

As further shown in FIG. 2, a second coolant inlet conduit 124 extends through second header 46 and is fluidically connected to second coolant channel 116 at second end section 120. A second coolant outlet conduit 125 extends through second header 46 and is fluidically connected to second end 108 of first coolant channel 104. The particular arrangement of coolant inlet conduits 122 and 124 and coolant outlet conduits 123 and 125 creates a cross-flow between adjacent energy storage cell rows 51 and 52. The cross-flow enhances heat exchange efficiency between coolant flowing through the first coolant channel 104 and the second coolant channel 116 and the first and second pluralities of energy storage cells 54 and 55.

At this point, it should be understood that coolant fluid flowing through first coolant plate 93 and second coolant plate 95 may be driven by a pump (not shown) and passed through a heat exchanger (also not shown). First and second inlet conduits 122 and 124 are fluidically connected through a cooling supply line 126 which, in turn, is fluidically connected to the pump (not shown) and first coolant outlet 123 and second coolant outlet 125 may direct heat entrained fluid through a coolant exit line 127 and on into the heat exchanger (also not shown).

Referring to FIG. 4, a first coolant fluid 128 passes through first coolant channel 104 and a second coolant fluid 129 flows through second coolant channel 116. The particular type of coolant fluid may vary and could include liquid coolants such as water solutions, glycol solutions, and the like as well as gaseous coolants. In addition to coolant fluid, air may pass through gaps 130 that are formed when second, curvilinear surface 102 meets with second, curvilinear surface section 114 as shown in, for example, FIG. 4. The air may be forced convection air streams that are guided over battery pack 40.

Furthermore, gaps 130 between the first coolant plate 93 and second coolant plate 95 can accommodate an amount of compression developed through operation of battery pack 40 by allowing an amount of deformation of, for example, second, curvilinear surface 102 and/or second, curvilinear surface section 114. The amount of deformation of second, curvilinear surface 102 and/or second, curvilinear surface section 114 may be between about 0.1-mm and about 2-mm.

Figure 5:
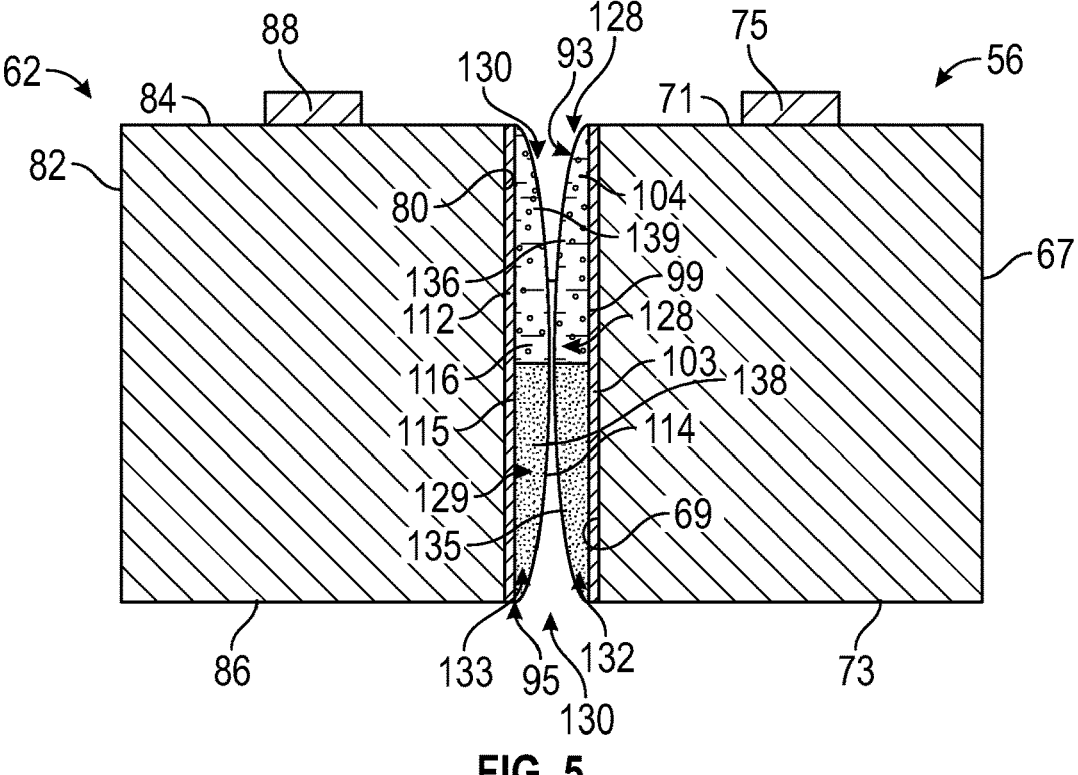
FIG. 5 is a side elevational view of one of the first plurality of cells and one of the second plurality of cells and first and second coolant plates of FIG. 3 including an amount of two-phase coolant, in accordance with a non-limiting example.

In a non-limiting example shown in FIG. 5, first coolant fluid 128 may take the form of a first two-phase coolant 132 and second coolant fluid 129 may take the form of a second two-phase coolant 133. First two-phase coolant 132 includes a first or liquid portion 135 and a second or gas portion 136. Likewise, second two-phase coolant 133 may includes a liquid portion 138 and a gas portion 139. First and second two-phase coolants 132 and 133 may change phase when exposed to and absorbing heat from first and second energy storage cell rows 51 and 52.

Figure 6:
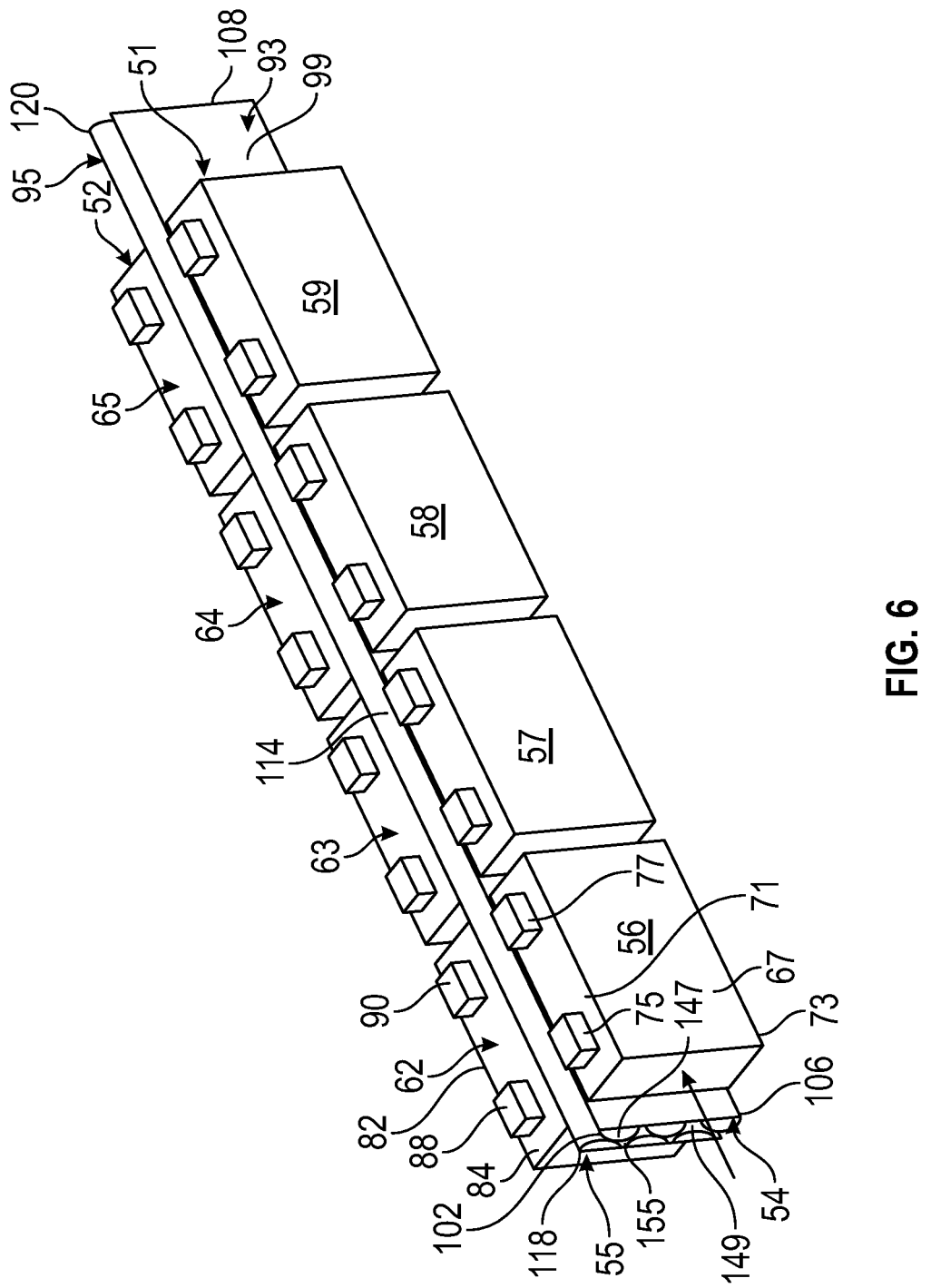
FIG. 6 is a perspective view of the first plurality of cells and second plurality of cells and first and second coolant plates, in accordance with another non-limiting example.
Figure 7:
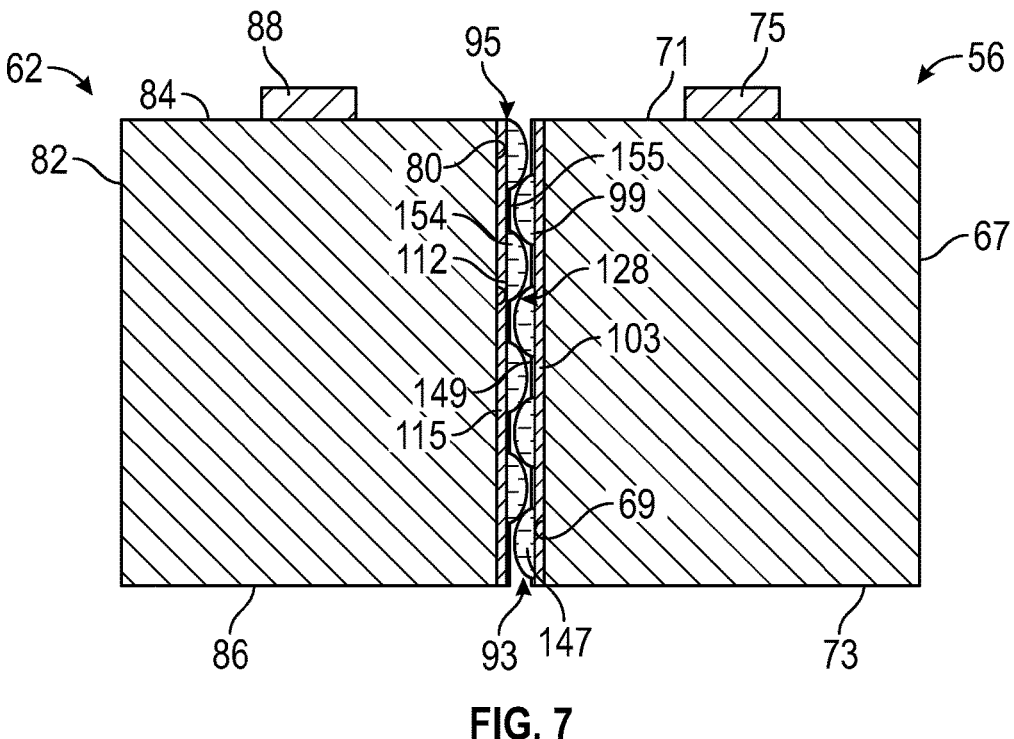
FIG. 7 is a side elevational view of one of the first plurality of cells and one of the second plurality of cells and first and second coolant plates of FIG. 6, in accordance with a non-limiting example.

Referring to FIGS. 6 and 7, first coolant plate 93 may include a first plurality of generally semi-circular coolant channels, one of which is indicated at 147. Semi-circular coolant channels 147 are spaced one, from another through a first gap 149. Semi-circular coolant channels 147 extend between first end 106 and second end 108 and fluidically connect with first coolant inlet conduit 122 and first coolant outlet conduit 123. Second coolant plate 95 includes a second plurality of generally semi-circular coolant channels 154 spaced one, from another, through a second gap 155. With this arrangement, first plurality of generally semi-circular coolant channels 147 nest in each second gap 155 and second generally semi-circular coolant channels 154 nest within each first gap 149 as shown in FIG. 7.

In addition to enhancing surface area contact that increases heat transfer, gaps 149 and 155 may allow one or more of the first plurality of generally semi-circular coolant channels 147 and the second plurality of generally semi-circular coolant channels 154 to deform so as to accommodate cell expansion in a manner similar to that discussed with reference to first coolant plate 93 and second coolant plate 95. The particular arrangement, geometry, and construction of first generally semi-circular coolant channels 147 and second generally semi-circular coolant channels 154 enhances heat transfer efficiency.

Figure 8:
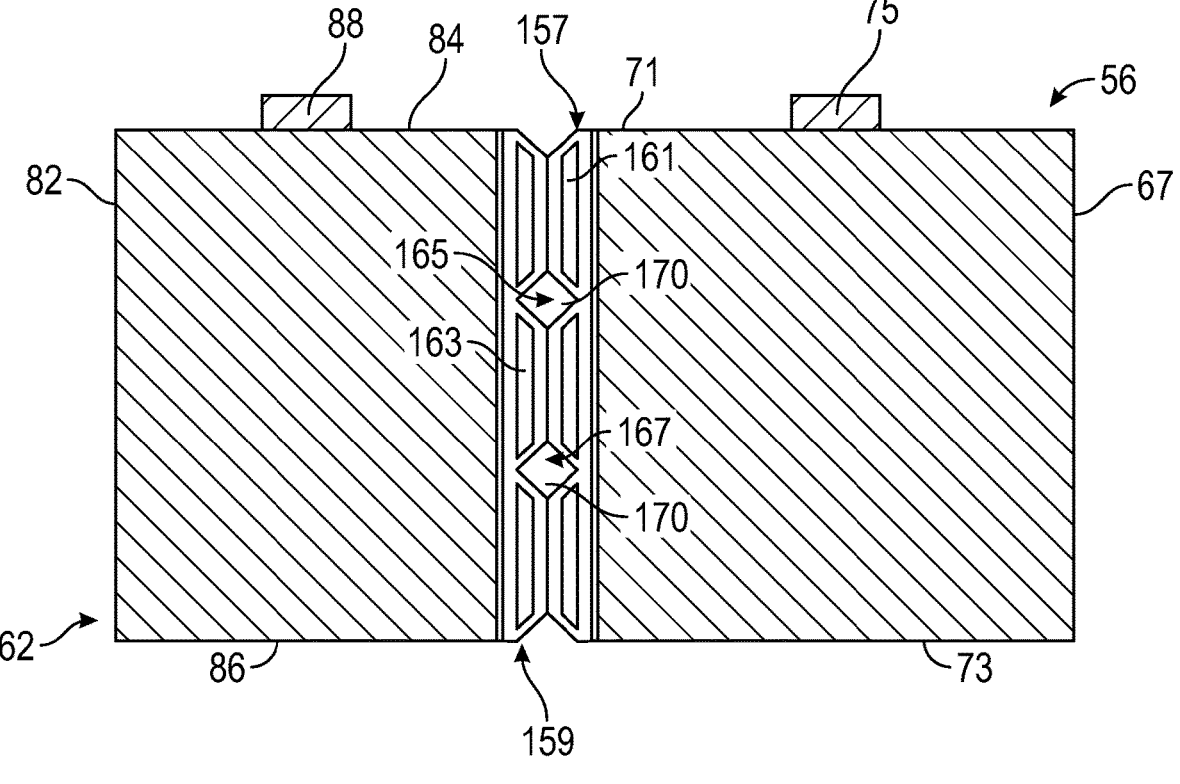
FIG. 8 is a side elevational view of one of the first plurality of cells and one of the second plurality of cells and first and second coolant plates of FIG. 6, in accordance with yet another non-limiting example.

Reference will now follow to FIG. 8 in describing a first hybrid coolant plate 157 and a second hybrid coolant plate 159 in accordance with another non-limiting example. First hybrid coolant plate 157 and second hybrid coolant plate 159 may be formed through an additive manufacturing process, an investment mold process, or the like. First hybrid coolant plate 157 includes a first plurality of coolant fluid channels, one of which is indicated at 161. Similarly, second hybrid coolant plate 159 includes a second plurality of coolant fluid channels, one of which is indicated at 163.

In addition, first hybrid coolant plate 157 includes one or more first recesses, such as shown at 165 and second coolant plate 159 includes one or more second recesses such as shown at 167. First recesses 165 align with second recesses 167 to form additional cooling channels 170 that may carry an air flow between first hybrid coolant plate 157 and second hybrid coolant plate 159. In a non-limiting example, first plurality of coolant fluid channels 161 and second plurality of coolant fluid channels 163 may be sized, shaped, and arranged in order to absorb heat from each of the first row of energy storage cells 51 and the second energy storage cell row 52. That is, if a particular one of energy storage cell rows 51 and/or 52 is shown to include a localize hot zone, first plurality of coolant fluid channels 161 and/or second plurality of coolant fluid channels 163 may have an increased flow area.

At this point, it should be understood that the battery pack in accordance with exemplary embodiments employs a cooling mechanism that instead of placing a coolant plate on a lower or upper surface of energy storage cells, relies on coolant plates that run between adjacent rows of energy storage cells in order to increase heat transfer. Further, additional efficiencies are created by the use of both liquid and air cooling mechanisms in accordance with the above described non-limiting examples.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A battery pack comprising:
a first header including a first conduit;

a second header including a second conduit;

an energy storage system including a plurality of energy storage cells arranged between the first header and the second header; and a coolant plate arranged between the first header and the second header and abutting the plurality of energy storage cells, the coolant plate including a coolant channel having a first end fluidically connected to the first conduit, a second end fluidically connected to the second conduit, and an intermediate portion defining a flow path, wherein the coolant plate includes a first, substantially planar surface abutting the plurality of energy cells and a second surface that is curvilinear.

2. The battery pack according to claim 1, further comprising another plurality of energy storage cells arranged between the first header and the second header and spaced from the plurality of energy cells.

3. The battery pack according to claim 1, further comprising:

another coolant plate arranged between the first header and the second header and abutting each of the another plurality of energy storage cells, the another coolant plate including another coolant channel having a first end portion fluidically connected to the first conduit, a second end portion fluidically connected to the second conduit, and an intermediate section defining another flow path.

4. The battery pack according to claim 3, wherein the another coolant plate includes a first, substantially planar surface section abutting the another plurality of energy cells and a second surface section that is curvilinear.

5. The battery pack according to claim 4, wherein the second surface of the coolant plate abuts the second surface portion of the another coolant plate at a coolant plate interface.

6. The battery pack according to claim 5, further comprising a first air gap arranged at a first side of the coolant plate interface and a second air gap arranged at a second side of the coolant plate interface.

7. The battery pack according to claim 3, wherein the coolant channel includes a first plurality of semi-circular coolant channels spaced one from another along the second surface and the another coolant channel includes a second plurality of semi-circular coolant channels spaced one from another along the second surface section, a portion of the second plurality of semi-circular coolant channels being disposed between adjacent ones of the first plurality of semi-circular coolant channels.

8. The battery pack according to claim 1, further comprising an amount of coolant fluid arranged in the first conduit, the coolant channel, and the second conduit.

9. The battery pack according to claim 8, wherein the amount of coolant fluid comprises a two-phase fluid.

10. The battery pack according to claim 1, wherein the first conduit includes a first coolant inlet conduit and a first coolant outlet conduit and the second conduit includes a second coolant inlet conduit and a second coolant outlet conduit, the first coolant inlet conduit being fluidically connected to the second coolant outlet conduit and the second coolant inlet conduit being fluidically connected to the first coolant outlet conduit.

11. A vehicle comprising:
a body defining a passenger compartment;
an electric motor supported in the body; and
a battery pack operatively connected to the electric motor, the battery pack comprising:
a first header including a first conduit;

a second header including a second conduit;

a plurality of energy storage cells arranged between the first header and the second header; and a coolant plate arranged between the first header and the second header and abutting the plurality of energy storage cells, the coolant plate including a coolant channel having a first end fluidically connected to the first conduit, a second end fluidically connected to the second conduit, and an intermediate portion defining a flow path, wherein the coolant plate includes a first, substantially planar surface abutting the plurality of energy cells and a second surface that is curvilinear.

12. The vehicle according to claim 11, further comprising another plurality of energy storage cells arranged between the first header and the second header and spaced from the plurality of energy cells.

13. The vehicle according to claim 11, further comprising:

another coolant plate arranged between the first header and the second header and abutting each of the another plurality of energy storage cells, the another coolant plate including another coolant channel having a first end portion fluidically connected to the first conduit, a second end portion fluidically connected to the second conduit, and an intermediate section defining another flow path.

14. The vehicle according to claim 13, wherein the another coolant plate includes a first, substantially planar surface section abutting the another plurality of energy cells and a second surface section that is curvilinear.

15. The vehicle according to claim 14, wherein the second surface of the coolant plate abuts the second surface portion of the another coolant plate at a coolant plate interface.

16. The vehicle according to claim 15, further comprising a first air gap arranged at a first side of the coolant plate interface and a second air gap arranged at a second side of the coolant plate interface.

17. The vehicle according to claim 13, wherein the coolant channel includes a first plurality of semi-circular coolant channels spaced one from another along the second surface and the another coolant channel includes a second plurality of semi-circular channels spaced one from another along the second surface section, a portion of the second plurality of semi-circular coolant channels being disposed between adjacent ones of the first plurality of semi-circular coolant channels.

18. The vehicle according to claim 11, further comprising an amount of coolant fluid arranged in the first conduit, the coolant channel, and the second conduit.

19. The vehicle according to claim 18, wherein the amount of coolant fluid comprises a two-phase fluid.

20. The vehicle according to claim 11, wherein the first conduit includes a first coolant conduit and a first coolant outlet conduit and the second conduit includes a second coolant inlet conduit and a second coolant outlet conduit, the first coolant inlet conduit being fluidically connected to the second coolant outlet conduit and the second coolant inlet conduit being fluidically connected to the first coolant outlet conduit.

* * * * *